(No Model.)
J. B. McMULLIN.
FISHING APPARATUS.
No. 574,561.  Patented Jan. 5, 1897.
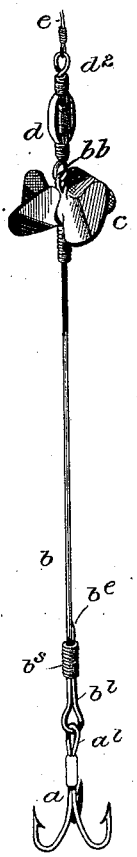
Witnesses
Arthur Ashley
N. R. Kenney
Inventor
James B. McMullin
By [signature]
Attorney

UNITED STATES PATENT OFFICE.

JAMES B. McMULLIN, OF SHAKOPEE, MINNESOTA.

FISHING APPARATUS.

SPECIFICATION forming part of Letters Patent No. 574,561, dated January 5, 1897.

Application filed April 7, 1896. Serial No. 586,528. (No model.)

*To all whom it may concern:*

Be it known that I, JAMES B. MCMULLIN, a citizen of the United States, and a resident of the city of Shakopee, in the county of Scott, in the State of Minnesota, have invented a new and useful Fishing Apparatus, of which the following is a correct description.

The invention relates particularly to improvements in apparatus for trolling; and the object of the invention is to provide a means whereby a natural half-twirling and undulating motion shall be imparted to the bait without danger of loss of or injury to the appliance by means of which such twirling and undulating motion is produced.

It has been common to provide at the upper extremity of the shank of a fish-hook, at the point at which the line is attached, a "propeller" or twirler, composed ordinarily of several concentric reversely-curved blades or paddles of copper or analogous soft metal, the object being to produce in the minnow or other like bait upon the hook, as it is moved in the operation of trolling, a motion similar to that of a fish when swimming. A propeller or twirler thus attached has been employed with some degree of success; but objection is made to it because of its fragility and consequent extreme liability in the described position to destruction in practical use, for it will be obvious that if the propeller or twirler be composed of other than very thin metal its undue weight will cause the hook and the bait to sink too far below the surface of the water; and, on the other hand, that if it be composed of light metal the grip of the jaws of a vigorous fish will crush the propeller or twirler into a shapeless mass, even if it does not tear it in pieces or carry it away altogether.

Another objection to the attachment of the line and the propeller directly to the loop or eye of the hook is found in the liability of the line to be severed by the sawing action of the teeth of the fish.

It has been ascertained by repeated experiments that attachment to the hook of a section of strong wire of a length of five or six inches, more or less, and having rigidly attached to its upper extremity a winged concentrically-mounted propeller or twirler, has served not only to obviate both the objections indicated, but has moreover operated to impart to the bait a more natural movement than has before resulted, with a consequent marked increase in the "catch" of fish.

The invention therefore consists in the combination, in a fishing apparatus, of a fish-hook, a section of wire loosely connected to the upper extremity of the hook, a concentrically-arranged twirler or propeller upon the upper extremity of the section of wire, and a trolling-line connected to the upper extremity of the wire.

In the accompanying drawing, which constitutes a part of this specification, the figure represents an elevation of the fishing apparatus, in which the hook $a$ and the protecting wire section $b$ are represented as loosely connected together. At or near its upper extremity the wire section $b$ receives the propeller or twirler $c$, which is by any suitable means rigidly attached to the section of wire. At the upper extremity of the section $b$ a loop $bb$ may be provided for attachment of a double-swivel connection $d$, which by an eye $d^2$ at its upper extremity receives the free end of the trolling-line $e$.

In the practical use of the apparatus the securing-sleeve $bs$ upon the loop $bl$ at the lower extremity of the wire section $b$ is moved upward to a point above the turned-back extremity $be$ of the section, which being done the engaging loop $al$ of the hook $a$ may be disengaged by being moved along the section until it is no longer within the embrace of the turned-back extremity $be$ of the wire. This means for attachment of a hook is well known to be old, and it should be understood that it is not herein claimed as novel. The free looped end of the section may then be readily thrust lengthwise through the body of the minnow or like bait, whereupon the hook may be quickly readjusted in its original engagement with the terminal loop $bl$ of the wire, and the sleeve $bs$ may be moved to its original loop-securing position.

It will readily be understood from the foregoing that by reason of the provision of the section of wire the twirling appliance, as well as the trolling-line, is placed beyond the grasp of the jaws of the fish and is thus made safe from injury, while at the same time the useful function of the twirler is made available in even a more marked degree than before.

The invention having been thus described, what is claimed is—

1. The described fishing apparatus, consisting of the hook *a;* the wire section *b;* the twirler *c;* and the line *e;* the hook being loosely and detachably attached to the wire section; the twirler being rigidly mounted and concentrically arranged upon the upper portion of the wire section; and the line being connected to the upper extremity of the wire section; substantially as and for the purposes set forth.

2. The combination in a fishing apparatus, of a fish-hook; a guard-section, of wire, loosely connected to the upper extremity of the fish-hook; a concentrically-arranged propeller-like twirler, rigidly mounted upon the upper portion of the section of wire; and a trolling-line, connected to the upper extremity of the section of wire; substantially as shown and described, and for the purposes specified.

In testimony whereof I have hereunto affixed my signature in the presence of two subscribing witnesses.

JAMES B. McMULLIN.

Witnesses:
A. E. L. KEESE,
SAMUEL C. KERR.